Nov. 19, 1929.  T. LEKA  1,736,541
MANUALLY DRIVEN AEROPLANE
Filed July 14, 1928   2 Sheets-Sheet 1
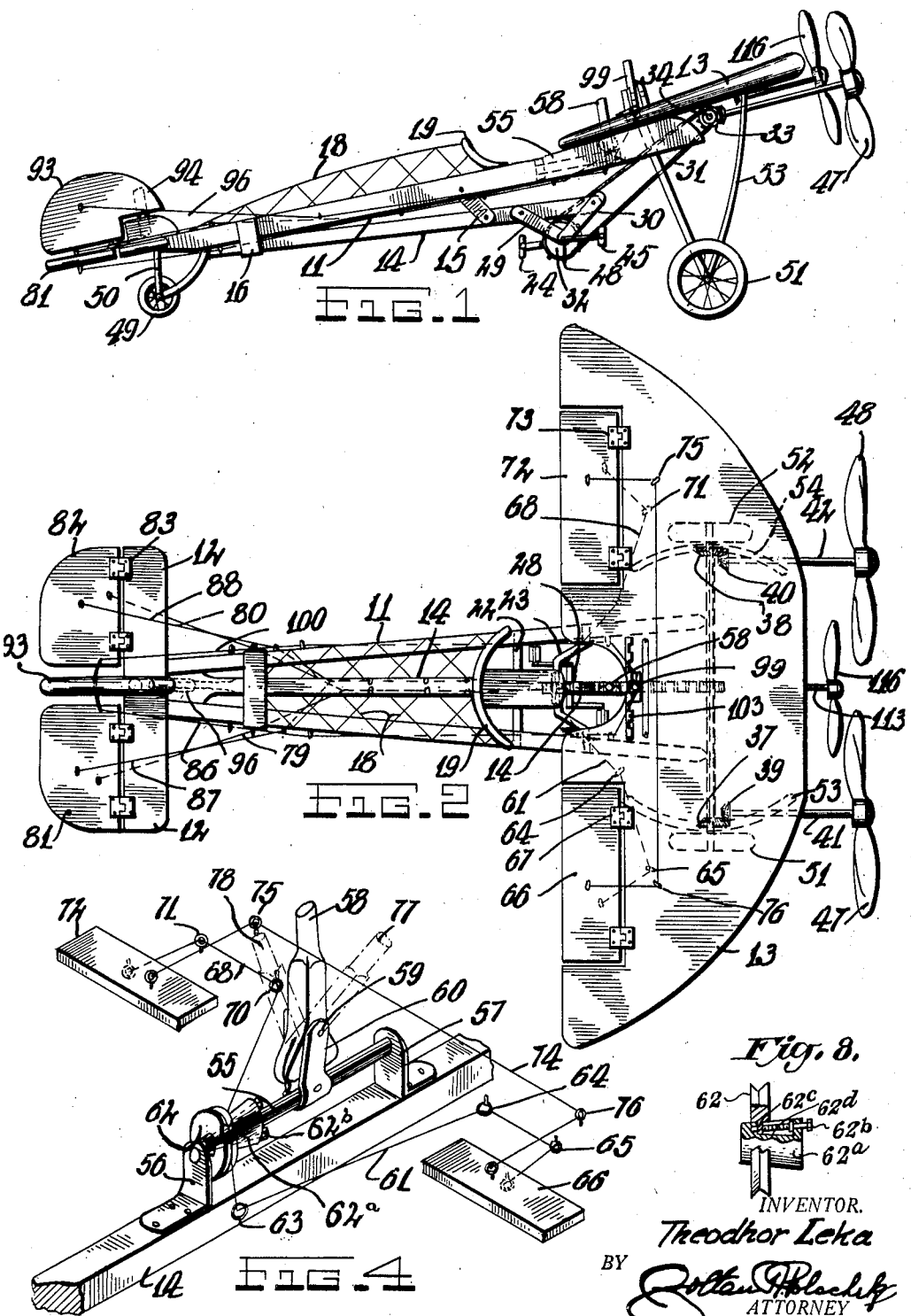

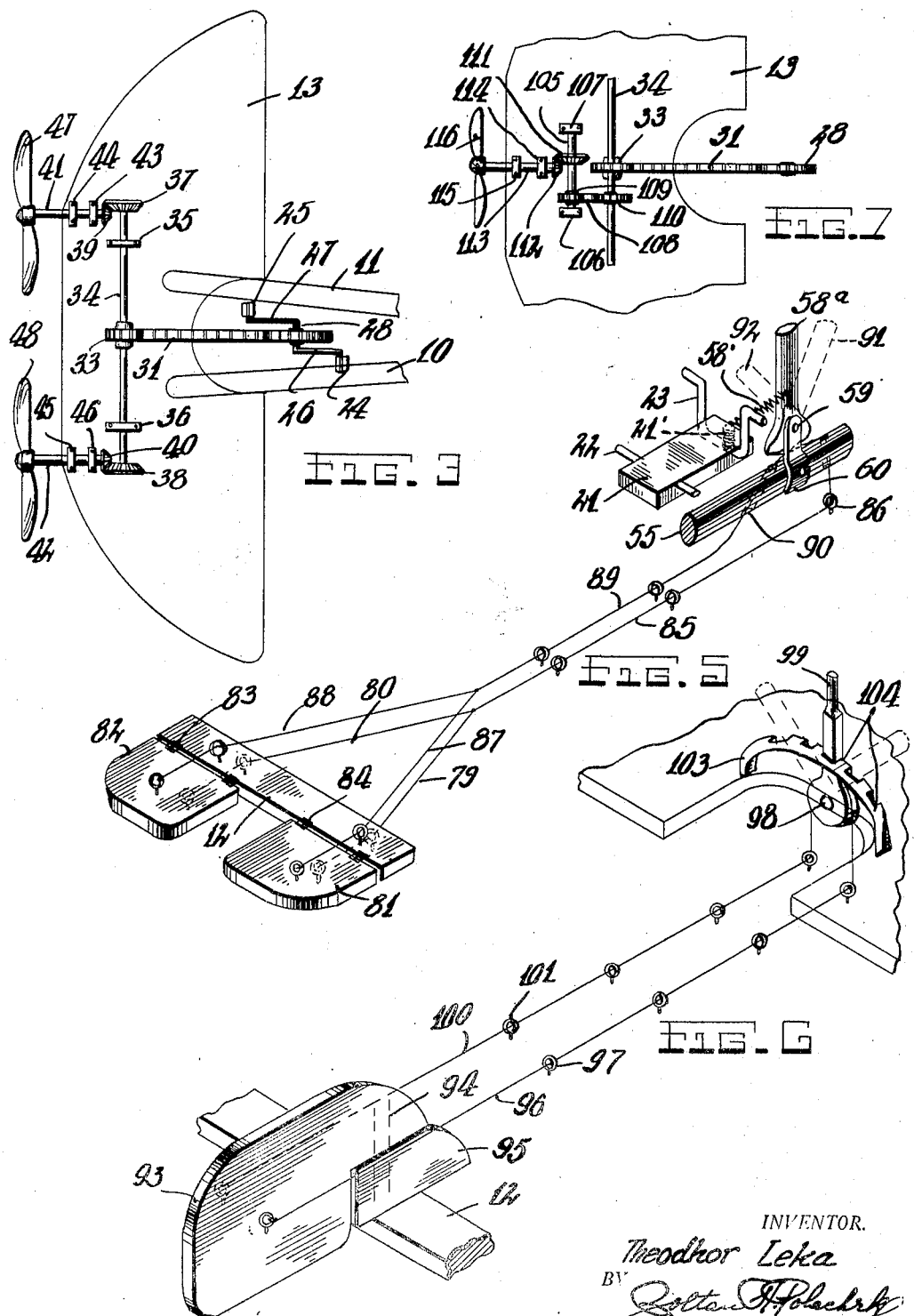

Patented Nov. 19, 1929

1,736,541

UNITED STATES PATENT OFFICE

THEODHOR LEKA, OF NEW YORK, N. Y.

MANUALLY-DRIVEN AEROPLANE

Application filed July 14, 1928. Serial No. 292,682.

This invention relates to a new and useful device in the nature of an aeroplane embodying a mechanism providing foot propulsion.

The object of the invention is to provide an aeroplane of novel construction and arrangement of parts adapted for all classes of flying without the employment of a motor thereby eliminating the usual risks which obviously accompany such aeroplanes.
Further object will become apparent in the following description, appended claims and accompanying drawings.

Fig. 1 is a side elevational view of my improved aeroplane.
Fig. 2 is a top plan view thereof.

Fig. 3 is a fragmentary bottom plan view thereof.

Fig. 4 is an enlarged fragmentary perspective view thereof showing in particular the aileron operating mechanism.

Fig. 5 is a similar view showing in particular the elevator operating mechanism.

Fig. 6 is a similar view showing the rudder operating mechanism.
Fig. 7 is a fragmentary bottom plan view illustrating further development of my improved aeroplane.

Fig. 8 is a detail side elevational view of the pulley shown in Fig. 4, partly shown in section.

As here embodied my improved aeroplane comprises a framework consisting of a pair of longitudinal members 10 and 11, secured at the rear thereof to the transverse member
12. The frame members 10 and 11 converge somewhat from the said transverse member 12 and extend forward therefrom and are secured to the wing 13 in proximity to the central portion thereof. The above mentioned frame work also includes a lower longitudinal member 14, which is secured at its rear extremity to the rear under portion of the members 10 and 11. The lower member 14 extends forward, directly under the frame members 10 and 11, and is secured thereto as at 15 and 16 by clips or suitable supports.

The above mentioned frame work is supported or reinforced by a woven wire construction 18 secured to the lower member 14 at the rear portion thereof and extended forward therefrom and secured to the central portion of a wire 19 of bent or arch shape construction, forward upwardly and secured to the longitudinal members 10 and 11 somewhat at the rear of the wing 13.

A seat 21 adapted to accommodate the operator of my improved aeroplane is pivotally mounted on the support 22 secured to the frame members 10 and 11, and is normally held in a somewhat upwardly inclined angular position by means of an expansion spring 21' positioned under the seat 21 and mounted on a second support 23, secured to and extended from the frame members 10 and 11. The seat 21 is positioned or located intermediate the said frame members 10 and 11, somewhat at the rear of the wing 13.

A pair of pedals 24 and 25, are rotatively mounted on the crank hangers 26 and 27, oppositely extended from the shaft 28, rotatively mounted on the extended extremities of supports 29 and 30, secured at their upper extremities to the lower frame member 14, directly below the above mentioned seat 21. The pedals 24 and 25 are positioned within easy reach of the feet of the operator of my improved aeroplane.

A suitable chain 31 is extended over a sprocket 32 mounted on the shaft 28 and over a sprocket 33 mounted on a shaft 34 rotatively mounted in the brackets 35 and 36 secured to the under portion of the wing 13.

Bevel gears 37 and 38 are secured to the extremities of the shaft 34 and mesh respectively with bevel pinions 39 and 40 mounted on the shafts 41 and 42 rotatively mounted in brackets 43, 44 and 45, 46 secured to the under side of the wing 13. The shafts 41 and 42 extend somewhat beyond the front of the wing 13 and have secured thereto at their extended extremities propellers 47 and 48.

It is to be understood that sprocket wheel 32 is of large diameter and is provided with suitable coaster mechanism which will allow pedaling of the device at a comparatively low rate of speed and will drive the propellers rapidly even if the pedals are in stationary position while the flyer is resting. The train of gears are so proportioned to drive propellers 47 and 48 at the desired amount of revolutions.

The above described construction is such as will permit the operator of my improved aeroplane to rotate the propellers 47 and 48 by the foot operation or rotation of the pedals 24 and 25, as is common to the propulsion of bicycles, tricycles and the like, for the purpose of propelling my improved aeroplane.

I have also provided the usual rear wheel 49 rotatively mounted on a support 50 secured to the rear portion of the frame members 10 and 11. A pair of front wheels 51 and 52 are rotatively mounted on the supports 53 and 54, secured to and extended from the under portion of the wing 13. The latter described construction is such as will provide suitable landing and alighting facilities for my improved aeroplane.

In Fig. 4 of the accompanying drawing I have shown a shaft 55 rotatively mounted in supports 56 and 57, secured to the lower frame member 14 and positioned directly under the seat 21, and extended somewhat at the front and rear thereof. An operating lever 58 is pivotally mounted as at 59, at its lower extremity to a clip 60 secured to the shaft 55. A flexible member 61 is secured to the pulley 62 mounted on the shaft 55, and is extended therefrom through guides 63, 64 and 65, eyelets or the like secured to the frame member 14 and to the wing 13 and is secured at its extended extremity to the aileron 66 hinged as at 67 to the rear portion of the wing 13 in proximity to one side thereof. The pulley 62 has a tapered inner section $62^a$ and a rim section composed of several separate parts arranged for being fixed along the length of section $62^a$ by reason of being slidably connected on the section $62^a$ by tongue $62^c$ engaging in groove $62^d$ and threadedly engaged by screws $62^b$ rotatively mounted in the section $62^a$. Thus the rim sections may be positioned at the small end of the tapered section $62^a$ for reducing the acting diameter of the pulley and the acting effect of motion of the lever 58 thru a certain angle.

A similar flexible member 68 is secured to the pulley 62 and is extended therefrom through similar guides 69, 70 and 71 secured to the frame member 14 and to the wing 13 and is secured at its extended extremity to the aileron 72 hinged as at 73 to the rear portion of the wing 13, in proximity to the opposite side of the above mentioned aileron 66. A flexible member 74 is secured at its extremities to the ailerons 66 and 72 and is extended through guides 75 and 76 secured to the wing 13.

The latter described construction is such as will permit the aileron 66 to be angularly upwardly inclined and the ailerons 72 to be angularly downwardly inclined, or reverse angular positions to be secured by the pivoting of the lever 58, as designated by the reference numerals 77 and 78, respectively. It is understood that the said ailerons are employed to maintain the equilibrium of my improved aeroplane when turning, as is common to flying machines.

In Fig. 5, of the accompanying drawing, I have shown flexible members 79 and 80, secured to the under side of the elevators 81 and 82 hinged as at 83 and 84, to the opposite sides of the above mentioned transverse member 12. The flexible members 79 and 80 are extended from the elevators and are secured to a flexible member 85, extended therefrom through a guide 86 or eyelet secured to any convenient portion of the frame work of my improved aeroplane in proximity to the operating lever 58. The flexible member 85 is secured to the lower portion of the said lever $58^a$.

Flexible members 87 and 88 are secured to the upper sides of the elevators 81 and 82 and are extended therefrom and are secured to a flexible member 89, extended through an opening 90 formed in the shaft 55 and secured to the lower portion of the lever 58.

The latter described construction is such as will permit the elevators 81 and 82 to be angularly positioned downwardly and upwardly when the operating lever 58 is pivoted to the front or to the rear as designated respectively by the reference numerals 91 and 92. It is understood that the elevators are employed to raise or lower my improved aeroplane during flight as is common to flying machines.

A tension spring 58' is secured to the seat 21 and to the lever 58, as a means of holding the lever 58 somewhat inclined to the rear so as to normally hold the elevators in a somewhat angularly downwardly inclined position so as to force my improved aeroplane to fly upwardly.

A rudder 93 is pivotally attached as at 94 to a pin carried in the rudder support 95 secured to the transverse member 12. A flexible member 96 is secured to one side of the rudder and is extended through guides 97 secured to any suitable portion of the frame work. The flexible member 96 is secured to the lower portion 98 of an operating lever 99. A similar flexible member 100 is secured to the opposite side of the rudder 93 and is extended therefrom through guides 101 secured to the said frame work and is secured to the lower portion 98 of the lever 99. The lever 99 is pivotally mounted on a bracket 102 secured to the wing 13 within easy reach of the operator. An engaging member 103 is secured to the wing 13 and is formed or bent so as to provide a plurality of notches 104 adapted to receive the lever 99 for the purpose of frictionally holding the said lever in any desired angular position. The above described construction is such as will permit the rudder to be pivoted to the right or the left as is desired to steer my improved aeroplane during flight, by the pivoting of the lever 99, manually operated by the operation of my improved aeroplane.

I have also embodied in a further development of my improved aeroplane a shaft 105 rotatively mounted in brackets 106 and 107 secured to the under side of the wing 13, somewhat in front of the shaft 34. A sprocket chain 108 is extended over a sprocket 109 secured to the shaft 105 and over a sprocket 110 secured to the shaft 34. A bevel gear 111 is secured to the shaft 105 and meshes with a bevel pinion 112 secured to a shaft 113. The shaft 113 is rotatively mounted in brackets 114 and 115 secured to the underside of the wing 13. The shaft 113 is extended somewhat in front of the wing 13 and has secured thereto at its extended extremity a propeller 116. The latter described construction is such as will permit the propeller 116 to be rotated in unison with the hereinbefore mentioned propellers 47 and 48, for the purpose of increasing the flying speed of my improved aeroplane.

Having thus described my invention what I claim as new and desire to secure by United States Letters Patent is:

1. In combination with an aeroplane, a seat connected by means of a tension spring to the elevator operating lever of the said aeroplane as a means of normally holding the said elevators in an angularly downwardly inclined position, when the said seat is occupied, the said seat pivotally mounted on a support and residing on a coil spring secured to a second support.

2. An aeroplane construction embodying a seat of the said aeroplane connected by a tension spring to the elevator operating lever of said aeroplane as a means of normally holding the said elevators in an angularly downwardly inclined position, when the said seat is occupied, the said seat pivotally mounted on a support and residing on a coil spring secured to a second support.

3. In a device of the class described, a wing provided with ailerons, a shift rotatively supported on the device, a lever connected therewith for turning same thru a portion of a revolution, a tapered wheel hub fixed on the shaft, rim sections mounted on the tapered hub and arranged for assuming fixed positions, and flexible members fixed on the rim sections and connected with the ailerons and arranged for pivoting the ailerons when the lever is moved, the amount of movement of the ailerons for a given movement of the lever being determined by the position of the rim sections on the tapered wheel hub.

4. In a device of the class described, a wing provided with ailerons, a shaft rotatively supported on the device, a lever connected therewith for turning same thru a portion of a revolution, a tapered wheel hub fixed on the shaft, rim sections mounted on the tapered hub and arranged for assuming fixed positions by reason of being threadedly engaged by screws rotatively mounted on the hub, and flexible members fixed on the rim sections and connected with the ailerons and arranged for pivoting the ailerons when the lever is moved, the amount of movement of the ailerons for a given movement of the lever being determind by the position of the rim sections on the tapered wheel hub.

5. In a device of the class described, a wing provided wing ailerons, a shaft rotatively supported on the device, a lever connected therewith for turning same thru a portion of a revolution, a tapered wheel hub fixed on the shaft, rim sections mounted on the tapered hub and arranged for assuming fixed positions by reason of being slidably mounted on the hub and engaged by screws rotatively mounted on the hub, and flexible members fixed on the rim sections and connected with the aileron and arranged for pivoting the ailerons when the lever is moved, the amount of movement of the ailerons for a given movement of the lever being determined by the position of the rim sections on the tapered wheel hub.

In testimony whereof I have affixed my signature.

THEODHOR LEKA.